United States Patent [19]
Barr

[11] Patent Number: 5,991,238
[45] Date of Patent: Nov. 23, 1999

[54] WEIGHTED BACKUS FILTER METHOD OF COMBINING DUAL SENSOR TRACES

[75] Inventor: Frederick J. Barr, Houston, Tex.

[73] Assignee: Western Atlas International, Inc., Houston, Tex.

[21] Appl. No.: 09/095,348

[22] Filed: Jun. 9, 1998

[51] Int. Cl.$^6$ ............................................. G01V 1/38
[52] U.S. Cl. ............................ 367/62; 367/24; 367/62; 367/22; 367/46; 702/101; 702/173
[58] Field of Search ....................... 367/24, 46, 43, 367/62, 22, 57; 702/101, 173

[56] References Cited

U.S. PATENT DOCUMENTS

| | | | |
|---|---|---|---|
| 4,979,150 | 12/1990 | Barr | 367/24 |
| 5,396,472 | 3/1995 | Paffenholz | 367/24 |
| 5,621,700 | 4/1997 | Moldovean | 367/24 |
| 5,774,416 | 6/1998 | Sadek et al. | 367/24 |
| 5,774,417 | 6/1998 | Corrigan et al. | 367/24 |

*Primary Examiner*—Christine K. Oda
*Assistant Examiner*—Anthony Jolly
*Attorney, Agent, or Firm*—J. Albert Riddle; Charles R. Schweppe

[57] ABSTRACT

A method for attenuating water column reverberations in a dual sensor seismic signal, whereby a pressure signal and a velocity signal are transformed from the time domain to the frequency domain, generating a transformed pressure signal and a transformed velocity signal, respectively. Values for weighting factors $K_p$ and $K_v$ are selected and multiplied times the transformed pressure signal and the transformed velocity signal, respectively, generating a weighted pressure signal and a weighted velocity signal, respectively. The weighted pressure signal and the weighted velocity signal are summed, generating a summed signal. Values for ocean bottom reflectivity R and Z, the frequency domain delay operator for two-way travel time in the water layer, are determined. A weighted inverse Backus filter is calculated and multiplied times the summed signal, generating a filtered signal. The filtered signal is transformed from the frequency domain to the time domain.

3 Claims, 4 Drawing Sheets

WEIGHTED BACKUS FILTER METHOD OF COMBINING DUAL SENSOR TRACES

BACKGROUND OF THE INVENTION

1. Field of the Invention

The present invention relates generally to marine seismic prospecting and, more particularly, to a method for combining dual sensor seismic data to attenuate water column reverberations in the case in which one of the signals contains significantly more random noise than the other.

2. Description of the Related Art

Marine seismic prospecting is a method for taking seismic profiles of underwater subterranean land formations. In marine seismic prospecting, a seismic survey ship is equipped with at least one energy source and at least one receiver. An energy source is designed to produce compressional waves that propagate through the water and into the subterranean formations. As the compressional waves propagate through the subterranean formations, they strike interfaces between formations, commonly referred to as strata, and reflect back through the earth and water to a receiver. The receiver is designed to detect the reflected compressional waves. The receiver typically converts the detected waves into electrical signals which are later processed into an image that provides information about the structure of the subterranean formations.

Different energy sources may be used to generate acoustic waves in marine applications. Presently, one of the most common marine energy sources is an air gun that discharges air under very high pressure into the water. The discharged air forms an energy pulse which propagates through the water and the underlying subterranean formations. Another marine energy source frequently used is a marine vibrator. Marine vibrators typically include a pneumatic or hydraulic actuator that causes an acoustic piston to vibrate at a range of selected frequencies.

Similarly, different receivers may be used to detect reflected acoustic waves. The receivers most commonly used in marine seismic prospecting are hydrophones. Hydrophones detect and convert pressure waves into electrical signals that are used for analog or digital processing. The most common type of hydrophone includes a piezoelectric element which converts pressure into electrical signals. Another receiver sometimes used in a marine setting is a geophone. Geophones detect particle velocity. Geophones are typically used in land operations where the geophones are anchored to the ground to maintain correspondence of geophone motion to ground motion. In marine applications, however, anchoring the geophones is difficult. Typically, therefore, a gimbal mechanism is used to orient the geophone vertically for proper operation. Alternatively, accelerometers or displacement detectors may be used.

Hydrophones are typically mounted on a long streamer which is towed behind the survey ship at a depth of tens of feet. Alternatively, marine seismic prospecting may combine different types of receivers. For instance, in dual sensor ocean bottom cable seismic recording, a combination of hydrophones and geophones are deployed on the marine bottom. Typically, miles of bottom cable are deployed in a planned pattern such as a single line or a plurality of substantially parallel lines.

The use of ocean bottom cables is particularly effective in obtaining full three dimensional coverage in areas too shallow or too congested with obstacles for gathering seismic data with a towed streamer. While the ocean bottom cable technique allows access to areas denied to the towed streamer method, an additional, unwanted "ghost" reflection from the air water interface, along with subsequent reverberations, occurs for each primary reflection wave. The time delay between the primary reflection signal and the ghost reflection signal is greater with the ocean bottom cable method than with the towed streamer method because the detectors are farther removed from the air-water interface in the ocean bottom cable method, except in shallow water.

Two basic approaches have been proposed for eliminating the ghost reflection. The first approach involves recording signals from detectors at different depths and then performing a wavefield separation. The second approach utilizes co-located pairs of pressure and velocity detectors, as in, for example, U.S. Pat. No. 2,757,356, "Method and Apparatus for Canceling Reverberations in Water Layers", issued to Haggerty. This second approach capitalizes upon the fact that pressure and velocity detectors generate signals which are the same polarity for upward travelling waves but are of opposite polarity for downward travelling waves, that is, the ghost reflections. This indicates that the two signals can be properly summed to eliminate the unwanted reverberations associated with each reflection. In the frequency domain, this relationship expresses itself in the complimentary amplitude spectra of the two sensors. When the signals are properly summed, a smooth amplitude spectrum results.

U.S. Pat. No. 4,979,150, issued to present inventor Barr, assigned to the assignee of the present invention, and entitled "Method for Attenuation of Water-Column Reverberations" describes a dual sensor ocean bottom cable method for attenuating the unwanted water column reverberations associated with each reflection signal in the seismic data by combining the pressure and velocity signals recorded at each receiver station. The pressure and velocity signals are scaled and summed, with a scale factor dependent upon the acoustic impedance of the water and the earth material of the ocean bottom. Proper combination of the pressure and velocity signals, in order to remove the component of the signal representing energy which is trapped in the water layer, can only be performed after scaling the velocity signal by a scale factor S given by $$S = \frac{(1+R)}{(1-R)},$$

where R is the ocean bottom reflectivity. Thus the scale factor requires determining the ocean bottom reflectivity, which depends upon the acoustic impedance of the bottom material.

In the prior art, a calibration survey has been used to estimate the ocean bottom reflectivity R. In the weight-and-sum method of U.S. Pat. No. 4,979,150 described above, an estimate of the ocean bottom reflectivity is made by collecting separate reference information, generated by shooting a small seismic source directly over the receivers. The collection of this survey data requires additional time and cost beyond the data acquisition phase of the survey.

U.S. Pat. No. 5,365,492, issued to Dragoset, Jr., assigned to the assignee of the present invention, and entitled "Method for Reverberation Suppression", describes a dual sensor ocean bottom cable method for suppressing water column reverberations directly from the production dual sensor seismic data rather than from additional calibration data. Additionally, this weight-and-sum method works in the presence of random noise in the velocity signal. The noise is adaptively estimated and subtracted from the velocity signal.

The velocity and pressure signals are summed with trial scale factors and the sums are autocorrelated. A varimax function is computed for each autocorrelation and used to select the best scale factor.

U.S. Pat. Nos. 5,396,472 and 5,524,100, both issued to Paffenholz, assigned to the assignee of the present invention, and both entitled "Method for Deriving Water Bottom Reflectivity in Dual Sensor Seismic Surveys", describe a dual sensor ocean bottom cable method for estimating the ocean bottom reflectivity directly from the production data rather than from calibration data, using inverse Backus filters. In this method, time windowed common receiver station hydrophone and geophone traces are added together after correcting for any differences in transduction constants. Inverse Backus filters are then applied to these summed traces with a range of ocean bottom reflection values. The estimated reflectivity value is that which minimizes the energy in the resulting filtered traces, because this value has done the best job of eliminating the undesired water column reverberations. An optimization procedure determines which trial value for ocean bottom reflectivity minimizes the spectral power. Improved attenuation of water-column reverberations over previous methods results.

U.S. patent application No. 08/871,505, filed Jun. 9, 1997 by present inventor Barr along with Paffenholz and Chambers, assigned to the assignee of the present invention, and entitled "Method for Deriving Surface Consistent Reflectivity Map from Dual Sensor Seismic Data", describes a method which allows the determination of ocean bottom reflectivities at all the source and receiver locations. Since the acoustic impedance of the bottom material, and hence the ocean bottom reflectivity, can vary among different source and receiver locations, the scale factor can vary at different locations too. A "surface consistent" map of ocean bottom reflectivities gives the different values at different locations.

Since the introduction of the dual sensor method in 1989, data has been recorded in many areas in which the vertical geophone traces contain strong random noise. Such noise compromises the quality of the prestack combined data. In some cases, the noise has been so severe that it has compromised the quality of the final imaged seismic data. In at least one seismic survey area of the world, the hydrophone data were noisier than the geophone data, but this has occurred only rarely.

When the hydrophone and vertical geophone data are combined using the weight-and-sum method, using either calibration shooting or Varimax derived scalars, the noise problem has typically been aggravated. In areas where the ocean bottom reflection coefficient is positive, which occurs in the vast majority of survey areas, the scalar that is multiplied times the geophone trace prior to summing with the hydrophone trace, is significantly larger than one. Thus a greater portion of the noisy geophone trace is used in the combined trace.

With the Backus filter method of combining dual sensor traces, the signal-to-noise ratio of the combined trace is improved relative to the weight-and-sum method because, regardless of ocean bottom reflectivity, equal portions of the geophone and hydrophone traces are used. However, in some cases, the signal-to-noise ratio of the geophone trace is so poor that the quality of the combined trace is still adversely affected.

SUMMARY OF THE INVENTION

The present invention is a method for attenuating water column reverberations in a dual sensor seismic signal. A pressure signal and a velocity signal are transformed from the time domain to the frequency domain, generating a transformed pressure signal and a transformed velocity signal, respectively. Values for weighting factors $K_p$ and $K_v$ are selected and multiplied times the transformed pressure signal and the transformed velocity signal, respectively, generating a weighted pressure signal and a weighted velocity signal, respectively. The weighted pressure signal and the weighted velocity signal are summed, generating a summed signal. Values for ocean bottom reflectivity R and Z, the frequency domain delay operator for two-way travel time in the water layer, are determined. A weighted inverse Backus filter is calculated and multiplied times the summed signal, generating a filtered signal. The filtered signal is transformed from the frequency domain to the time domain.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Figure 1:
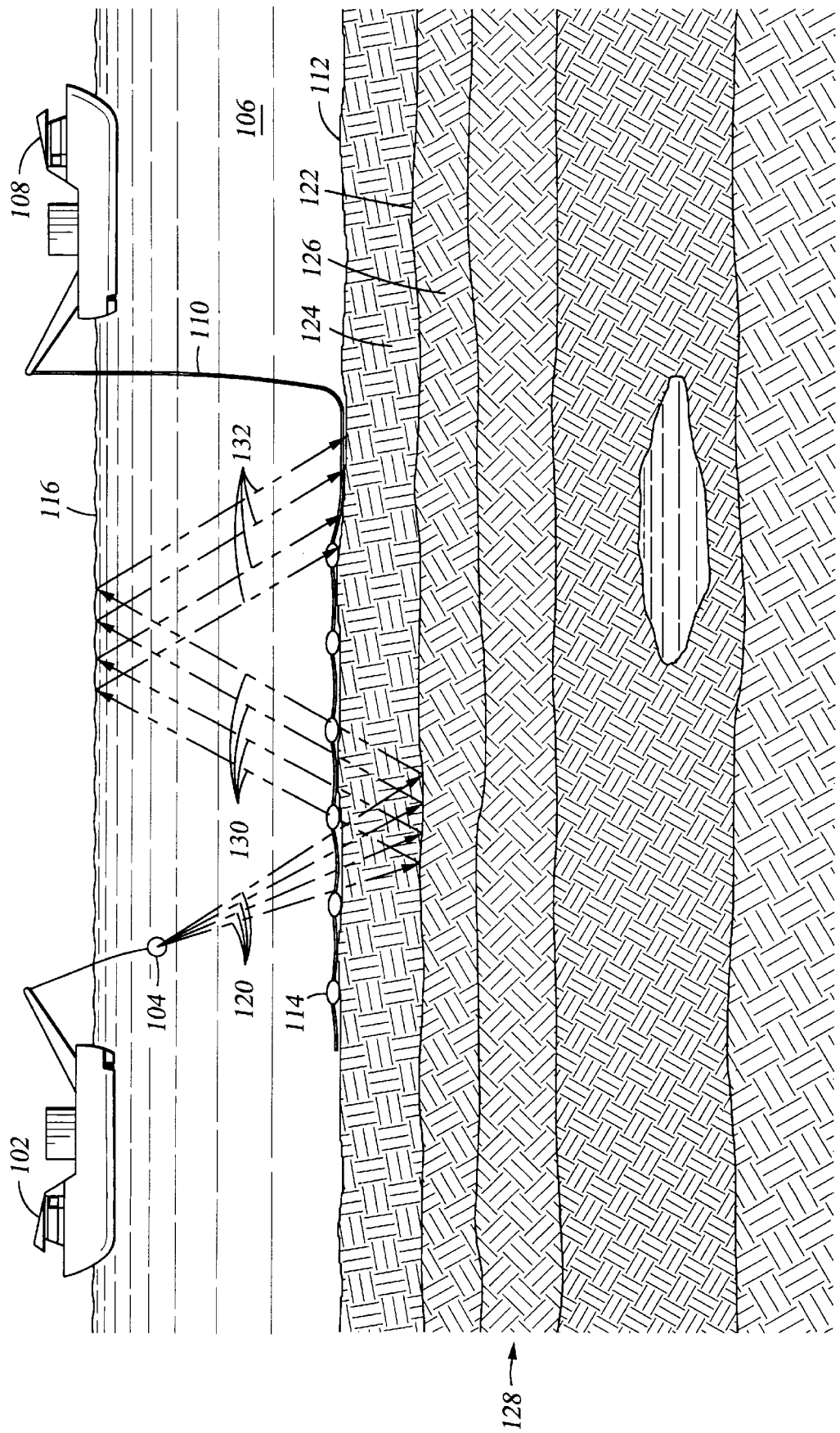
FIG. 1 is an illustration of apparatus used in a bottom cable operation.

FIG. 1 illustrates a preferred marine seismic survey system, generally designated by 100. The system 100 includes a seismic survey ship 102 that is adapted for towing a seismic energy source 104 or plurality of such seismic sources through a body of water 106. The seismic energy source 104 is an acoustic energy source or an array of such acoustic sources. An acoustic energy source 104 preferred for use with the system 100 is a compressed air gun, constructed and operated in a manner conventional in the art. The system 100 also includes a receiving ship 108 in the body of water 106. The receiving ship 108 deploys one or more cables 110 on the marine bottom 112, and receives signals from the cables 110. The cables 110 carry at least one receiver 114 each, but normally include a plurality of receivers 114.

The receivers 114 include co-located hydrophones for detecting water pressure and geophones for detecting water bottom particle velocity. More particularly, the hydrophones and geophones on the cables 110 are arranged so that each hydrophone has at least one gimballed geophone positioned next to it, when the cables 110 are deployed on the marine bottom 112. Electrical signals are sent to a recording system on the receiving ship 108 from the hydrophones and geophones. The survey ship 102 fires the source 104 at predetermined locations while the signals from the hydrophones and geophones are recorded. The signals are recorded by a multi-channel seismic recording system (not shown) that selectively amplifies, conditions and records time-varying electrical signals onto magnetic tape or some other storage medium. Advantageously, the seismic recording system also digitizes the received signals to facilitate signal analysis. Those skilled in the art will recognize that any one of a variety of seismic recording systems can be used.

According to a preferred practice, the cables 110 and their associated receivers 114 carrying hydrophones and geophones are positioned on the marine bottom 112. Production shooting takes place with the survey ship 102 moving at a constant speed along a pattern, such as a set of parallel lines, or swath, typically perpendicular to the cables 110. After the survey ship 102 completes the swath, the receiving ship 108 or other suitable ship retrieves the cables 110 and re-deploys the cables 110 in another pattern, such as lines spaced from, but parallel to, the previous cable locations. Once the cables 110 are re-deployed, the survey ship 102 shoots another pattern.

During data collection, seismic waves generated by the source 104 travel downwardly, as indicated by the rays 120. These primary waves are reflected off of interfaces between strata, such as the interface 122 between strata 124 and 126, in the subterranean earth formation 128. The reflected waves travel upwardly, as illustrated by the rays 130. The hydrophones and geophones which comprise the receivers 114 detect the reflected waves 130. The receivers 114 generate electrical signals representative of pressure and particle velocity changes in the seismic wave field, and transmit these generated electrical signals back to the survey ship 108 via the cable 110 or some other transmittal means, such as radio. The seismic recording system within the survey ship 108 records these electrical signals so that they can be subsequently processed to map the subterranean earth formation 128.

The receivers 114 detect both reflected waves of interest and unwanted reverberated waves which are noise. Reverberated waves are seismic waves which reflect off the water-air interface at the surface 116 of the water one or more times before finally traveling downwardly in the water 106 to impinge on the receivers 114. An example of reverberated waves is illustrated by the rays 132 in FIG. 1. The dual sensor ocean bottom cable method attenuates the unwanted water column reverberations 132 associated with each reflection signal by combining the pressure and velocity signals recorded at each receiver station 114. The two types of receivers used, preferably hydrophones and geophones, are different in their mechanical response and coupling to the environment. Thus the receivers may record significantly different signal-to-noise ratios. If the signal-to-noise ratio of one of the receivers in the dual sensor is poor, then prior art methods of combining the two signals have compromised the quality of the final imaged seismic data.

The purpose of the present invention is to allow a much smaller portion of the noisier of the two traces to be used to form the combined trace. The Backus filter is then modified to account for the unequal weighting of the geophone and hydrophone traces to accomplish the attenuation of the water column reverberations.

The expressions for the hydrophone and geophone traces in the Z-transform domain are the following:

$$P(Z) = \frac{1-Z}{(1+RZ)^2} \beta(Z) \quad (1)$$

$$V(Z) = \frac{1+Z}{(1+RZ)^2} \beta(Z) \quad (2)$$

where
$P(Z)$=Z-transform of the hydrophone trace,
$V(Z)$=Z-transform of the geophone trace,
Z=frequency domain delay operator for two-way vertical travel time in the water layer,
R=ocean bottom reflectivity, and
$\beta(Z)$=Z-transform of the subsurface reflection coefficient series.

The two-way travel in the water layer is from the ocean bottom to the air/water interface and back at the dual sensor location. Note that $\beta(Z)$ is the desired data. Z represents the operator that introduces a time delay in the frequency domain. Its expression in the frequency domain is:

$$Z=e^{-i\omega\tau}=\cos(\omega\tau)-i\sin(\omega\tau), \quad (5)$$

where
$i=(-1)^{1/2}$,
$\omega$=radial frequency, radians/sec, and
$\tau$=time delay, sec.

A value for water bottom reflectivity R may be determined by minimizing the energy in inverse Backus filtered sums of time windowed common receiver station hydrophone and geophone traces within a range of trial ocean bottom reflection values, as described in Paffenholz' U.S. Pat. Nos. 5,396,472 and 5,524,100, discussed above. The variable in delay operator Z that must be set for any hydrophone-geophone pair is the time delay $\tau$, a function of the water depth and the water velocity where the dual sensor is located. Also note that $\tau$ corresponds to the period of the water column reverberations. A value for $\tau$ may be determined by maximizing the crosscorrelation of iteratively time-delayed up-going and down-going signals, which have been computed from the pressure and velocity signals by adding and subtracting them, respectively. The function Z may be determined by inserting the appropriate value for $\tau$, the two-way travel time delay into Eq. (5). The time delay $\tau$ may also be derived from the ratio of twice the depth at the dual sensor location, given by fathometer readings, to the acoustic velocity in the water, either measured or estimated.

The Backus filter method employed in the prior art consists of applying the inverse Backus filter, $(1+RZ)^2$, to the sum of the transformed hydrophone and geophone traces, $[P(Z)+V(Z)]$. In the present invention, a weighted inverse Backus filter will be derived and applied to a weighted sum of the transformed traces. Thus, for the present invention, two weighting functions, $K_p$ and $K_v$, are introduced. These weighting functions are real numbers greater than zero and are applied to the transformed hydrophone and geophone traces, respectively, prior to summing. From Eqs. (1) and (2), this yields:

$$K_p P(Z) + K_v V(Z) = \frac{K_p(1-Z)}{(1+RZ)^2}\beta(Z) + \frac{K_v(1+Z)}{(1+RZ)^2}\beta(Z) \quad (3)$$

$$= \frac{K_p - K_p Z + K_v + K_V Z}{(1+RZ)^2}\beta(Z)$$

$$= \frac{(K_p + K_v) + (K_v - K_p)Z}{(1+RZ)^2}\beta(Z)$$

Solving Eq. (3) for the desired subsurface reflection coefficient series, $\beta(Z)$, yields:

$$\beta(Z) = [K_p P(Z) + K_v V(Z)] \frac{(1+RZ)^2}{(K_p + K_v) + (K_v - K_p)Z} \quad (4)$$

The first factor on the right side of Eq. (4) is the weighted sum of the transformed traces $[K_p P(Z)+K_v(Z)]$.

The second factor on the right side of Eq. (4) is the weighted inverse Backus filter $$\frac{(1+RZ)^2}{(K_p+K_v)+(K_v-K_p)Z}.$$

Alternatively, the weighted inverse Backus filter could be transformed from the frequency domain to the time domain and convolved with the weighted sum of traces calculated in the time domain. In this implementation, the traces would not have to be transformed from the time domain to the frequency domain.

As less of either the hydrophone or geophone trace is summed with its counterpart trace, the effectiveness with which the weighted inverse Backus filter attenuates water column reverberations becomes more sensitive to errors in the value of $\tau$ for all but the most negative ocean bottom reflections. As noted above, a positive value for ocean bottom reflectivity is typical.

Methods exist for accurately determining the value of $\tau$, and a single value performs very well for traces having relatively small offsets from their shot points. For larger source-receiver offset traces, however, the period between water column reverberations increase as a function of recording time because of the nonvertical travel path in the water column for the early reflection wavelets and their associated reverberation wavelets. Two approaches, well known to those skilled in the art, are available to deal with this phenomenon. One approach is to apply a time varying weighted inverse Backus filter to each summed trace. The other approach is to decompose each common receiver gather of summed traces into the tau-p domain. In this domain, a fixed weighted inverse Backus filter would be applied to each p-trace using its appropriate value of $\tau$.

If the geophone traces recorded in the field are significantly noisier than their counterpart hydrophone traces, one would like to choose $K_p$ equal to 1.0 and $K_v$ to be a very small positive real number, such as 0.1, to significantly improve the signal-to-noise ratio of the combined traces. However, as explained above, this requires knowing $\tau$ with a great deal of accuracy. The accuracy with which $\tau$ can be known varies from case to case depending upon the accuracy of the fathometers used in the field and the quality of features of the recorded data such as bandwidth and signal-to-noise ratio. Thus one is faced with a trade-off, requiring a balance between improved signal-to-noise ratio and decreased reverberations attenuation, due to errors in $\tau$. A method of determining the optimum value of $K_v$ is to start with both $K_p$ and $K_v$ set equal to 1.0. Combine the hydrophone and geophone traces into a weighted inverse Backus filtered signal and display the resulting amplitude spectra and autocorrelation functions of this filtered signal. Then, with decreasing values of $K_v$, this process is repeated to determine the point at which the amplitude spectra and autocorrelation functions indicate that the remaining amplitudes of the reverberations have become too large, for example, one-eighth the amplitude of their corresponding reflection wavelets. A similar procedure, with the roles of $K_p$ and $K_v$ reversed, would cover the contrary case in which the hydrophone traces recorded in the field are significantly noisier than their counterpart geophone traces.

Figure 2:
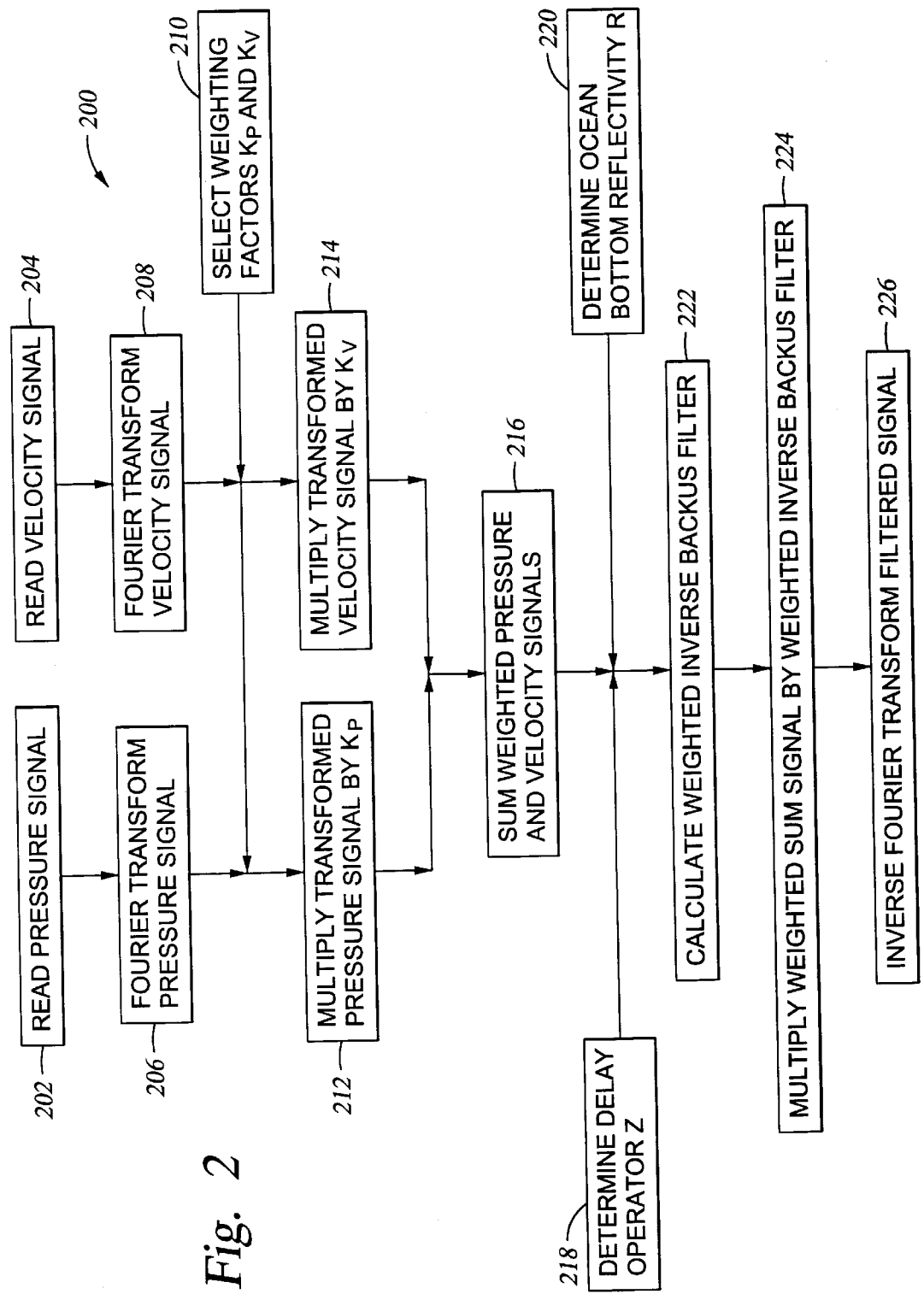
FIG. 2 is a flow diagram of the preferred implementation of the present invention for combining dual sensor seismic data to attenuate water column reverberations.

FIG. 2 illustrates a flow diagram which represents the preferred method for attenuating water column reverberations using dual sensor seismic data in which one of the sensor signals contains more random noise than the other. The preferred method illustrated is generally designated by 200. First, in blocks 202 and 204, the pressure signal, preferably as a hydrophone trace, and the velocity signal, preferably as a geophone trace, are read from co-located receivers, preferably a hydrophone and a geophone, respectively. Next, in blocks 206 and 208, the pressure signal from block 202 and the velocity signal from block 204 are transformed from the time domain to the frequency domain, generating a transformed pressure signal and a transformed velocity signal, respectively. The transformation is preferably made by applying a Fourier transform to the summed signal.

Next, in block 210, weighting factors $K_p$ and $K_v$ are selected. A preferred method for determining optimum weighting factors is described below in the discussion of FIG. 4. Then in blocks 212 and 214, the transformed pressure signal from block 206 and the transformed velocity signal from block 208 are multiplied by the weighting factors $K_p$ and $K_v$ from block 210, respectively, generating a weighted pressure signal and a weighted velocity signal, respectively. Then, in block 216, the weighted pressure signal from block 212 and the weighted velocity signal from block 214 are summed to generate a weighted sum signal

[$K_pP(Z)+K_vV(Z)$].

Next, in block 218 a value R for ocean bottom reflectivity is determined. The value for water bottom reflectivity R is preferably determined by minimizing the energy in inverse Backus filtered sums of time windowed common receiver station hydrophone and geophone traces with a range of trial ocean bottom reflection values. The determination of R is done without using a weighted sum or weighted inverse Backus filter. This is equivalent to the case $K_p=K_v=1.0$. Similarly, in block 220, a value for Z, the frequency domain delay operator for the two-way travel time in the water layer, is determined. A value for Z is preferably determined by maximizing the crosscorrelation of iteratively time-delayed up-going and down-going signals, which have been computed from the pressure and velocity signals by adding and subtracting them, respectively. The determination of Z is also done without using a weighted sum or weighted inverse Backus filter. Again, this is equivalent to the case $K_p=K_v=1.0$. In block 222, the weighted inverse Backus filter $$\frac{(1+RZ)^2}{(K_p+K_v)+(K_v-K_p)Z},$$

is calculated for the weighting factors $K_p$ and $K_v$ from block 210, the ocean bottom reflectivity value R from block 218, and the delay operator Z from block 220. In block 224, the weighted sum signal from block 216 is multiplied by the weighted inverse Backus filter from block 222, generating a filtered signal. Finally, in block 226, the filtered signal is transformed from the frequency domain back to the time domain, generating a signal with water column reverberations attenuated. The transformation is preferably made by applying an inverse Fourier transform to the filtered signal.

Figure 3:
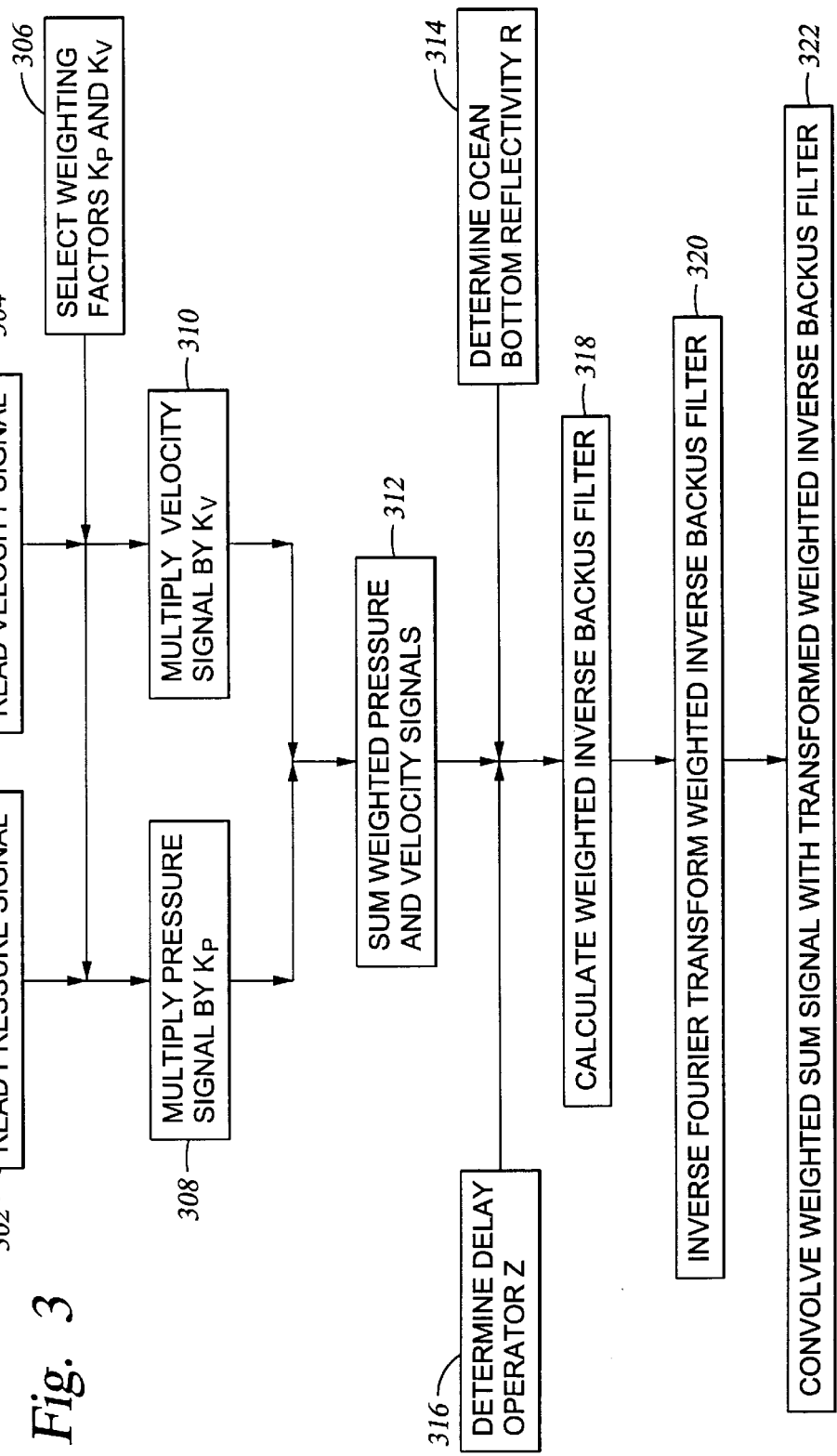
FIG. 3 is a flow diagram of an alternative implementation of the present invention for combining dual sensor seismic data to attenuate water column reverberations.

FIG. 3 illustrates a flow diagram which represents an alternative method for attenuating water column reverberations using dual sensor seismic data in which one of the sensor signals contains more random noise than the other. The alternative method illustrated is generally designated by 300. First, in blocks 302 and 304, the pressure signal, preferably as a hydrophone trace, and the velocity signal, preferably as a geophone trace, are read from co-located receivers, preferably a hydrophone and a geophone, respectively. Next, in block 306, weighting factors $K_p$ and $K_v$ are selected. A preferred method for determining optimum weighting factors is described below in the discussion of FIG. 4. Then in blocks 308 and 310, the pressure signal from block 302 and the velocity signal from block 304 are multiplied by the weighting factors $K_p$ and $K_v$ from block 306, respectively, generating a weighted pressure signal and a weighted velocity signal, respectively. Then, in block 312, the weighted pressure signal from block 308 and the weighted velocity signal from block 310 are summed to generate a weighted sum signal $$[K_p P(t) + K_v V(t)]$$

in the time domain.

Next, in block 314 a value R for ocean bottom reflectivity is determined. The value for water bottom reflectivity R is preferably determined by minimizing the energy in inverse Backus filtered sums of time windowed common receiver station hydrophone and geophone traces with a range of trial ocean bottom reflection values. The determination of R is done without using a weighted sum or weighted inverse Backus filter. This is equivalent to the case $K_p = K_v = 1.0$. Similarly, in block 316, a value for Z, the frequency domain delay operator for the two-way travel time in the water layer, is determined. A value for Z is preferably determined by maximizing the crosscorrelation of iteratively time-delayed up-going and down-going signals, which have been computed from the pressure and velocity signals by adding and subtracting them, respectively. The determination of Z is also done without using a weighted sum or weighted inverse Backus filter. Again, this is equivalent to the case $K_p = K_v = 1.0$. In block 318, the weighted inverse Backus filter $$\frac{(1+RZ)^2}{(K_p + K_v) + (K_v - K_p)Z},$$

is calculated for the weighting factors $K_p$ and $K_v$, from block 306, the ocean bottom reflectivity value R from block 314, and the delay operator Z from block 316. In block 320, the weighted inverse Backus filter from block 318 is transformed from the frequency domain back to the time domain, generating a transformed weighted inverse Backus filter. The transformation is preferably made by applying an inverse Fourier transform to the weighted inverse Backus filter. Finally, in block 322, the weighted sum signal from block 312 is convolved with the transformed weighted inverse Backus filter from block 320, generating a signal with water column reverberations attenuated.

Figure 4:
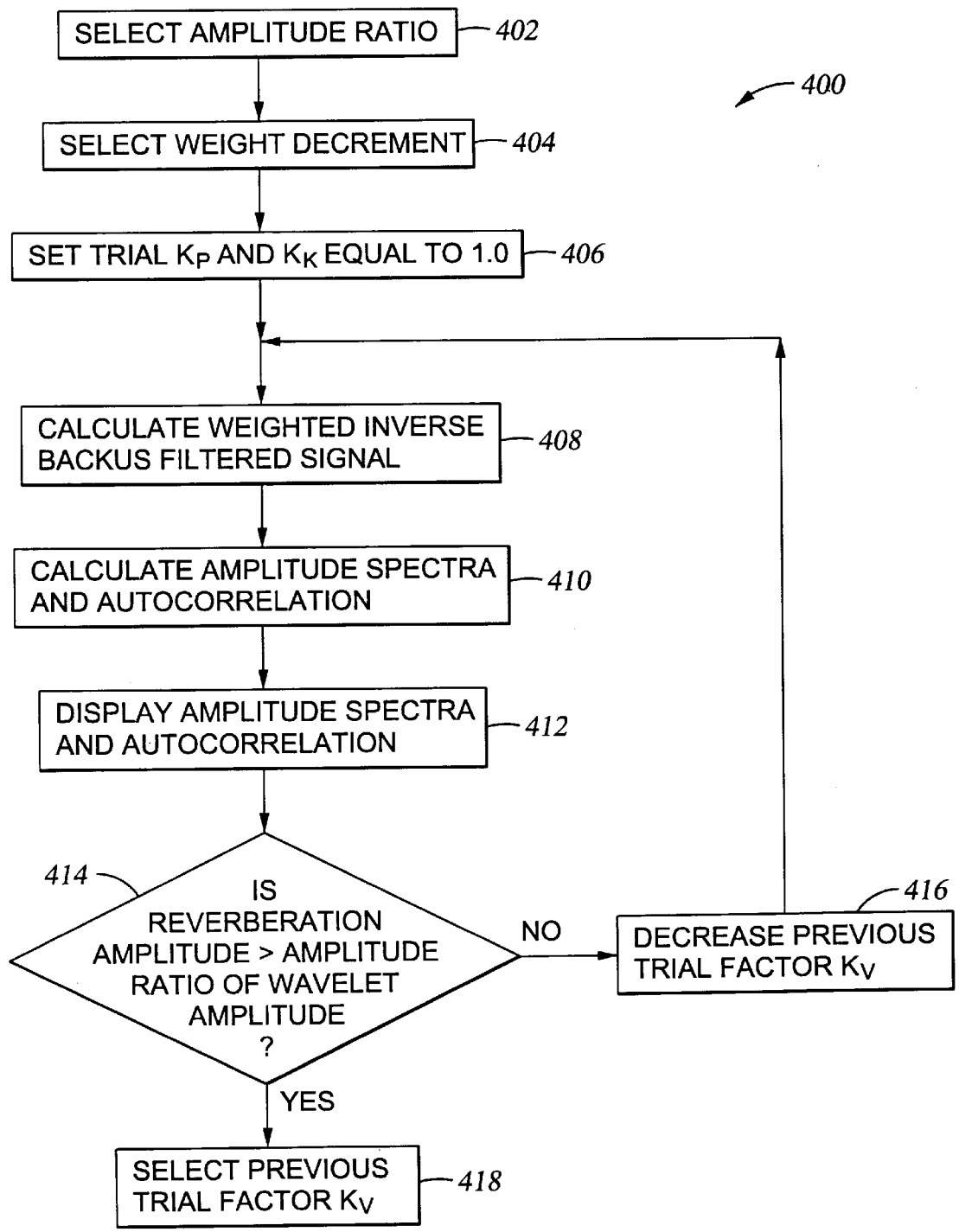
FIG. 4 is a flow diagram of the preferred method for determining weighting factors.

FIG. 4 illustrates a flow diagram which represents the preferred method for determining optimum values for the weighting factors $K_p$ and $K_v$ for selection in block 210 of FIG. 2 or block 306 of FIG. 3, above. The preferred method illustrated is generally designated by 400. First, in block 402, trial weighting factors I and $\tilde{K}_v$ are both set equal to 1.0. Next, in block 404, an amplitude ratio is selected. This amplitude ratio represents the maximum allowed ratio of reverberation amplitudes to wavelet amplitudes in the trial weighted inverse Backus filtered signals. Preferably the amplitude ratio is one-eighth. Then, in block 406, a weight decrement is selected. This weight decrement is the value by which trial weighting factor $\tilde{K}_p$ will be decreased for each trial.

Preferably, the weight decrement is 0.1.

In block 408, a weighted inverse Backus filtered signal $$[\tilde{K}_p P(Z) + \tilde{K}_v V(Z)] \frac{(1+RZ)^2}{(\tilde{K}_p + \tilde{K}_v) + (\tilde{K}_v - \tilde{K}_p)Z}$$

is calculated as described for the method generally designated as 200 in FIG. 2 above, using the trial weighting factors $\tilde{K}_p$ and $\tilde{K}_v$ from block 402. Next, in block 410, the autocorrelation function of the trial weighted inverse Backus filtered signal from block 408 is calculated. Next, in block 412, the amplitude spectra of the trial weighted inverse Backus filtered signal from block 408 and the autocorrelation functions of the trial weighted inverse Backus filtered signal from block 410 are displayed.

In block 414, it is determined if the amplitudes of the reverberations displayed in block 412 exceed the amplitude ratio from block 404 of the corresponding reflection wavelets displayed in block 412. If the determination is "no", then, in block 416, the value for the trial weighting factor $\tilde{K}_v$ is decreased by the selected weight decrement from block 406. The program logic loops back to block 408 and continues to calculate weighted inverse Backus filtered signals, calculate autocorrelations, and display amplitude spectra and autocorrelations, as in blocks 408, 410 and 412. If the determination in block 414 is "yes", then, in block 418, the previous trial value for $\tilde{K}_v$ is selected. This value for $\tilde{K}_v$ and the value of $\tilde{K}_p$ set equal to 1.0 will be the selected optimum values for the weighting factors $K_p$ and $K_v$, respectively, for selection in block 210 of FIG. 2 or block 306 of FIG. 3.

The present invention has been described with a certain degree of specificity. Further variations will occur to those skilled in the art which are within the scope of the invention.

I claim:

1. A method for attenuating water column reverberations in a dual sensor seismic signal, comprising the steps of:
   transforming a pressure signal and a velocity signal from the time domain to the frequency domain, generating a transformed pressure signal and a transformed velocity signal, respectively;
   selecting values for weighting factors $K_p$ and $K_v$;
   multiplying the transformed pressure signal and the transformed velocity signal by the weighting factors $K_p$ and $K_v$, respectively, generating a weighted pressure signal and a weighted velocity signal, respectively;
   summing the weighted pressure signal and the weighted velocity signal, generating a weighted sum signal;
   determining a value for R, ocean bottom reflectivity;
   determining a value for Z, the frequency domain delay operator for two-way travel time in the water layer;
   calculating a weighted inverse Backus filter $$(1+RZ)^2/[(K_p+K_v)+(K_v-K_p)Z];$$

multiplying the weighted sum signal by the weighted inverse Backus filter, generating a weighted inverse Backus filtered signal; and
   transforming the weighted inverse Backus filtered signal from the frequency domain to the time domain.

2. The method of claim 1, wherein the step of selecting the weighting factors comprises the steps of:
   (a) selecting an amplitude ratio;
   (b) selecting a weight decrement;
   (c) setting trial weighting factors $\tilde{K}_p$ and $\tilde{K}_v$ both equal to 1.0;

(d) calculating a trial weighted inverse Backus filtered signal, $$[\tilde{K}_p P(Z) + \tilde{K}_v V(Z)] \frac{(1+RZ)^2}{(\tilde{K}_p + \tilde{K}_v) + (\tilde{K}_v - \tilde{K}_p)Z}$$

using the trial weighting factors $\tilde{K}_p$ and $\tilde{K}_v$;

(e) calculating the autocorrelation of the trial weighted inverse Backus filtered signal;

(f) displaying the amplitude spectra and the autocorrelation of the trial weighted inverse Backus filtered signal;

(g) decreasing the trial weighting factor $\tilde{K}_v$ by the weight decrement;

(h) repeating steps (d) through (f) until reverberation amplitudes in the displayed trial weighted inverse Backus filtered signal exceed the value of the amplitude ratio times wavelet amplitude in the displayed trial weighted inverse Backus filtered signal; and (i) selecting the previous trial value of $\tilde{K}_v$ as the weighting factor $K_v$ and 1.0 as the weighting factor $K_p$.

3. A method for attenuating water column reverberations in a dual sensor seismic signal, comprising the steps of:

reading a pressure signal and a velocity signal;

selecting values for weighting factors $K_p$ and $K_v$;

multiplying the pressure signal and the velocity signal by the weighting factors $K_p$ and $K_v$, respectively, generating a weighted pressure signal and a weighted velocity signal, respectively;

summing the weighted pressure signal and the weighted velocity signal, generating a weighted sum signal;

determining a value for R, ocean bottom reflectivity;

determining a value for Z, the frequency domain delay operator for two-way travel time in the water layer;

calculating a weighted inverse Backus filter in the frequency domain $$(1+RZ)^2/[(K_p+K_v)+(K_v-K_p)Z];$$

transforming the weighted inverse Backus filter from the frequency domain to the time domain, generating a transformed weighted inverse Backus filter; and convolving the weighted sum signal with the transformed weighted inverse Backus filter.

\* \* \* \* \*